US011209099B2

(12) United States Patent
King

(10) Patent No.: US 11,209,099 B2
(45) Date of Patent: Dec. 28, 2021

(54) PRESSURE SAFETY VALVE INDICATOR

(71) Applicant: John B. King, Lockport, NY (US)

(72) Inventor: John B. King, Lockport, NY (US)

( * ) Notice: Subject to any disclaimer, the term of this patent is extended or adjusted under 35 U.S.C. 154(b) by 926 days.

(21) Appl. No.: 15/885,327

(22) Filed: Jan. 31, 2018

(65) Prior Publication Data

US 2018/0216751 A1    Aug. 2, 2018

Related U.S. Application Data

(60) Provisional application No. 62/452,454, filed on Jan. 31, 2017.

(51) Int. Cl.
*E21B 34/00* (2006.01)
*F16K 17/02* (2006.01)
*F16K 37/00* (2006.01)

(52) U.S. Cl.
CPC .......... *F16K 37/0066* (2013.01); *E21B 34/00* (2013.01); *F16K 17/02* (2013.01); *F16K 37/0033* (2013.01)

(58) Field of Classification Search
CPC ...... E21B 34/00; F16K 17/02; F16K 37/0033; F16K 37/0066
See application file for complete search history.

(56) References Cited

U.S. PATENT DOCUMENTS

| 2,607,510 | A | | 8/1952 | Ritchie |
| 3,398,761 | A | | 8/1968 | Grove et al. |
| 3,536,095 | A | | 10/1970 | Carteret et al. |
| 3,641,542 | A | | 2/1972 | Grove et al. |
| 3,896,280 | A | * | 7/1975 | Blake ................. H01H 36/0046 200/81.9 M |
| 4,274,435 | A | | 6/1981 | Block |
| 4,423,751 | A | | 1/1984 | Roettgen |
| 4,573,343 | A | | 3/1986 | Huiber |
| 4,846,219 | A | | 7/1989 | Schaefer |
| 5,144,977 | A | * | 9/1992 | Eggerton ............ F16K 37/0033 137/554 |
| 6,276,389 | B1 | * | 8/2001 | Taylor ................... F16K 17/406 137/312 |
| 8,967,196 | B2 | * | 3/2015 | Ha ...................... F16K 37/0041 137/554 |
| 8,978,690 | B2 | | 3/2015 | Hubbard, Sr. et al. |
| 2014/0374090 | A1 | | 12/2014 | Gonzalez Davila |
| 2015/0122354 | A1 | * | 5/2015 | Mills ................... F16K 37/0008 137/557 |

FOREIGN PATENT DOCUMENTS

| CN | 203405325 | 1/2014 |
| CN | 203572636 | 4/2014 |
| CN | 204739259 | 11/2015 |

* cited by examiner

*Primary Examiner* — Matthew R Buck
(74) *Attorney, Agent, or Firm* — Simpson & Simpson, PLLC; Michael Nicholas Vranjes

(57) ABSTRACT

A pressure safety valve (PSV) indicator arranged to be secured to a PSV discharge pipe over a first through-bore arranged therein, the PSV indicator including a connection including a first radially inward facing surface, an indicator cylinder, including a radially outward facing surface, a first end connected to the connection, a second end, and a second radially inward facing surface extending from the first end to the second end, a plunger slidably arranged in the indicator cylinder, the plunger including a head, and a neck having a third end, and an inductive proximity sensor operatively arranged to determine the position of the plunger.

18 Claims, 4 Drawing Sheets

PRESSURE SAFETY VALVE INDICATOR

CROSS-REFERENCE TO RELATED APPLICATIONS

This application claims the benefit under 35 U.S.C. § 119(e) of U.S. Provisional Patent Application No. 62/452,454, filed Jan. 31, 2017, which application is incorporated herein by reference in its entirety.

FIELD

The present disclosure relates to an indicator to be mounted on a pressure safety valve discharge pipe, in particular, an indicator that indicates when a discharge has occurred in the pressure safety valve.

BACKGROUND

A safety valve is a valve that acts as a fail-safe in a thermal-hydraulics plant. An example of safety valve is a pressure relief valve (PRV), which automatically releases a substance, or discharge, from a boiler, pressure vessel, or other system, when the pressure or temperature exceeds preset limits. Pilot-operated relief valves are a specialized type of pressure safety valve.

SUMMARY

According to aspects illustrated herein, there is provided a pressure safety valve (PSV) indicator arranged to be secured to a PSV discharge pipe over a first through-bore arranged therein, the PSV indicator comprising a connection including a first radially inward facing surface, an indicator cylinder, including a radially outward facing surface, a first end connected to the connection, a second end, and a second radially inward facing surface extending from the first end to the second end, a plunger slidably arranged in the indicator cylinder, the plunger including a head, and a neck having a third end, and an inductive proximity sensor operatively arranged to determine the position of the plunger.

According to aspects illustrated herein, there is provided a pressure safety valve (PSV) indicator arranged to be secured to a PSV discharge pipe over a through-bore arranged therein, the PSV indicator comprising an indicator cylinder, including a first end connected to the discharge pipe, a second end, a radially outward facing surface, and a radially inward facing surface extending from the first end to the second end, a plunger slidably arranged in the indicator cylinder, the plunger including a head, and a neck having a third end, and an inductive proximity sensor arranged proximate the second end and operatively arranged to determine the position of the plunger.

These and other objects, features, and advantages of the present disclosure will become readily apparent upon a review of the following detailed description of the disclosure, in view of the drawings and appended claims.

BRIEF DESCRIPTION OF THE DRAWINGS

Various embodiments are disclosed, by way of example only, with reference to the accompanying schematic drawings in which corresponding reference symbols indicate corresponding parts, in which.

DETAILED DESCRIPTION

At the outset, it should be appreciated that like drawing numbers on different drawing views identify identical, or functionally similar, structural elements. It is to be understood that the claims are not limited to the disclosed aspects.

Furthermore, it is understood that this disclosure is not limited to the particular methodology, materials and modifications described and as such may, of course, vary. It is also understood that the terminology used herein is for the purpose of describing particular aspects only, and is not intended to limit the scope of the claims.

Unless defined otherwise, all technical and scientific terms used herein have the same meaning as commonly understood to one of ordinary skill in the art to which this disclosure pertains. It should be understood that any methods, devices or materials similar or equivalent to those described herein can be used in the practice or testing of the example embodiments. The assembly of the present disclosure could be driven by hydraulics, electronics, and/or pneumatics.

It should be appreciated that the term "substantially" is synonymous with terms such as "nearly," "very nearly," "about," "approximately," "around," "bordering on," "close to," "essentially," "in the neighborhood of," "in the vicinity of," etc., and such terms may be used interchangeably as appearing in the specification and claims. It should be appreciated that the term "proximate" is synonymous with terms such as "nearby," "close," "adjacent," "neighboring," "immediate," "adjoining," etc., and such terms may be used interchangeably as appearing in the specification and claims. The term "approximately" is intended to mean values within ten percent of the specified value.

Figure 1:
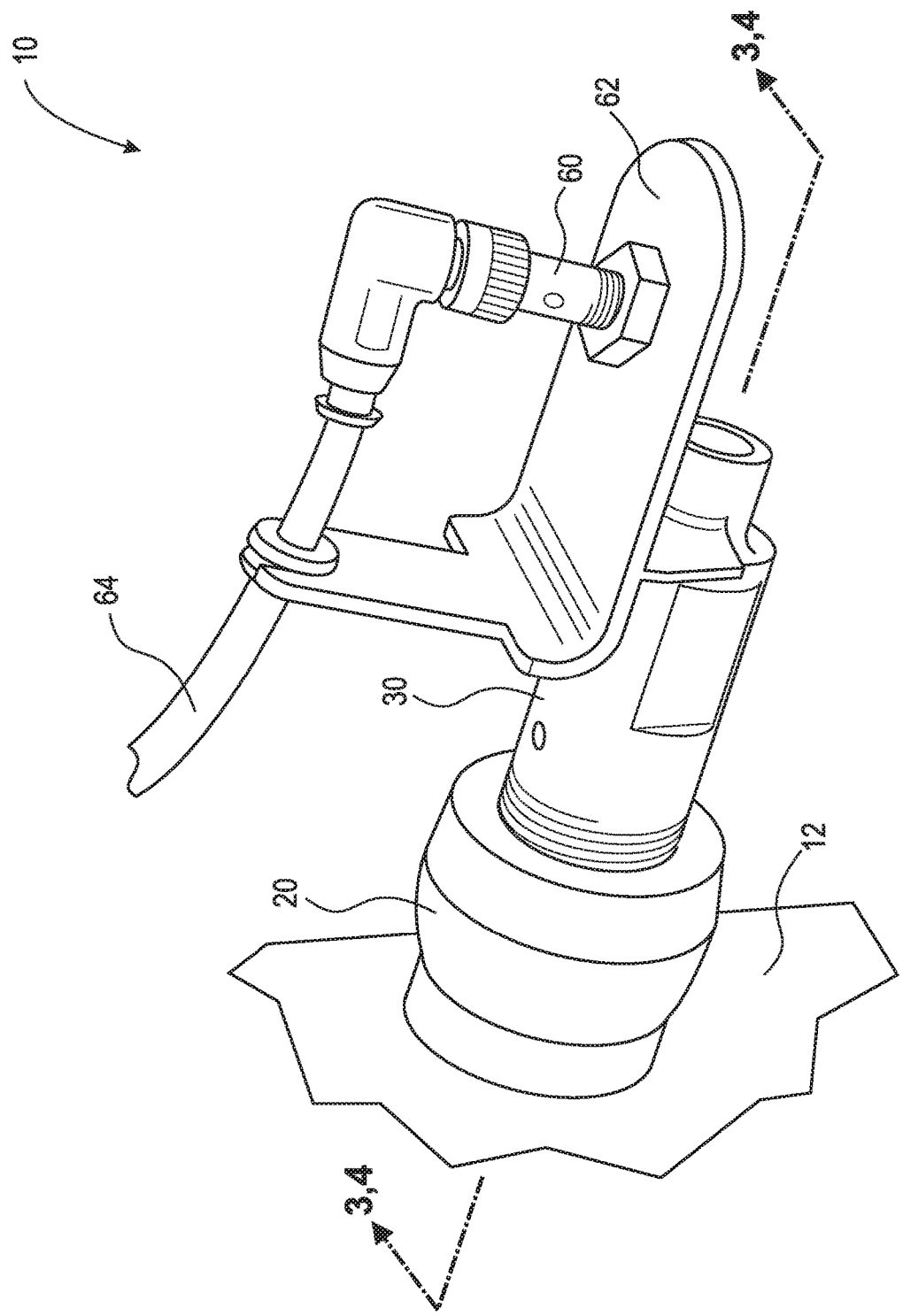
FIG. 1 is a top perspective view of a pressure safety valve indicator secured to a pressure safety valve discharge pipe.
Figure 2:
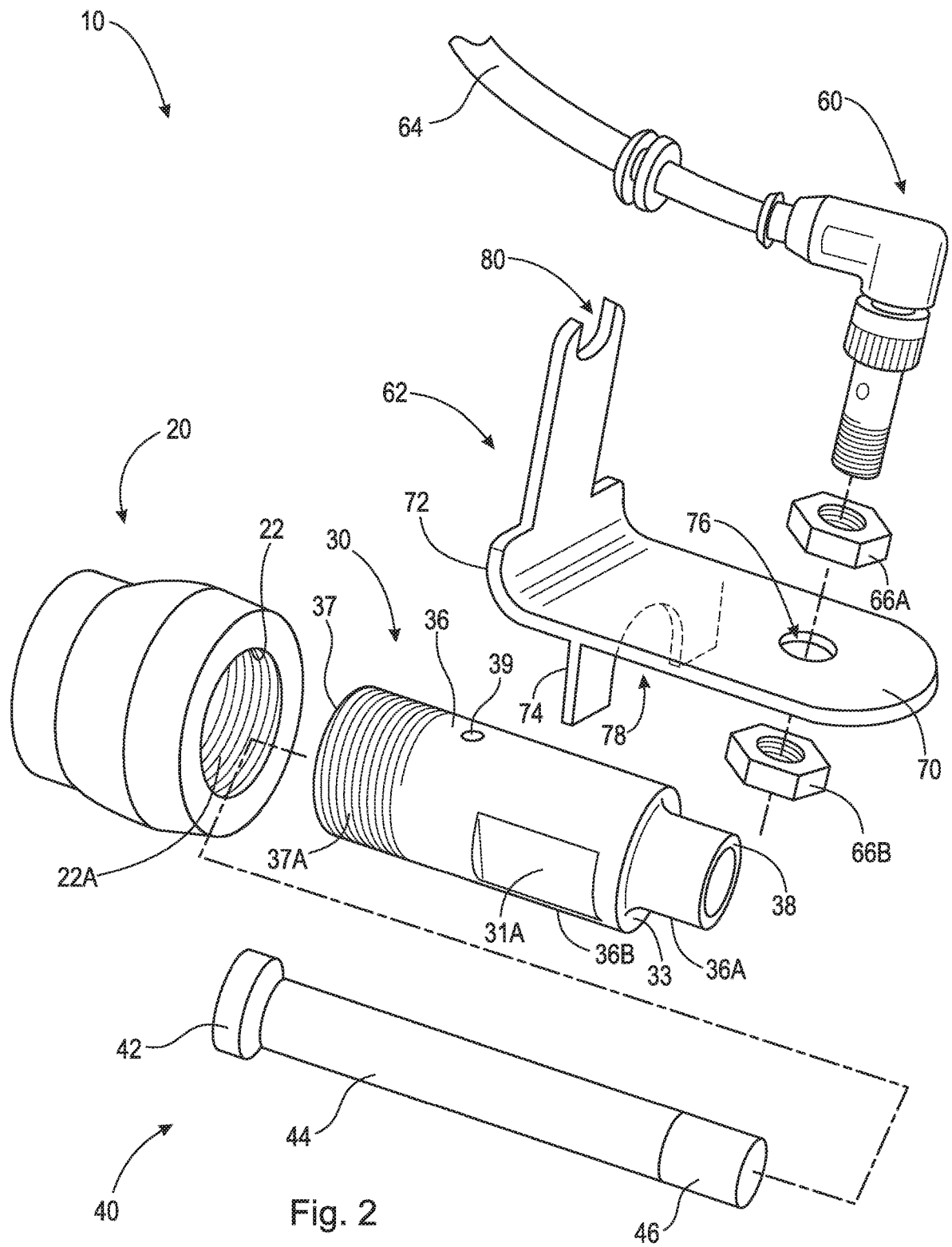
FIG. 2 is an exploded view of the pressure safety valve indicator shown in FIG. 1.
Figure 3:
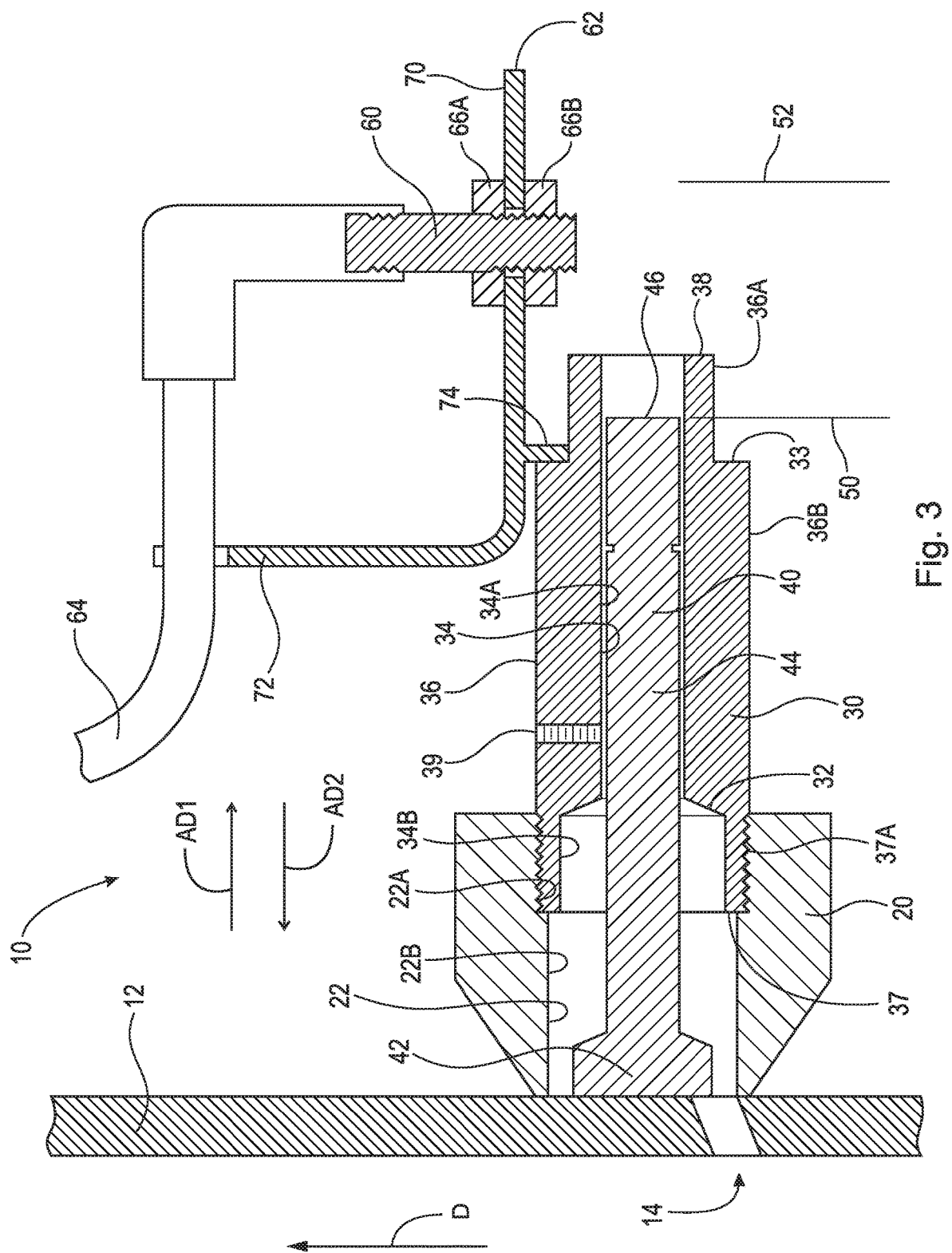
FIG. 3 is a cross-sectional view of the pressure safety valve indicator taken generally along line 3-3 in FIG. 1, with the inductor in the retracted position; and, FIG. 4 is a cross-sectional view of the pressure safety valve indicator taken generally along line 4-4 in FIG. 1, with the inductor in the triggered position.
Figure 4:
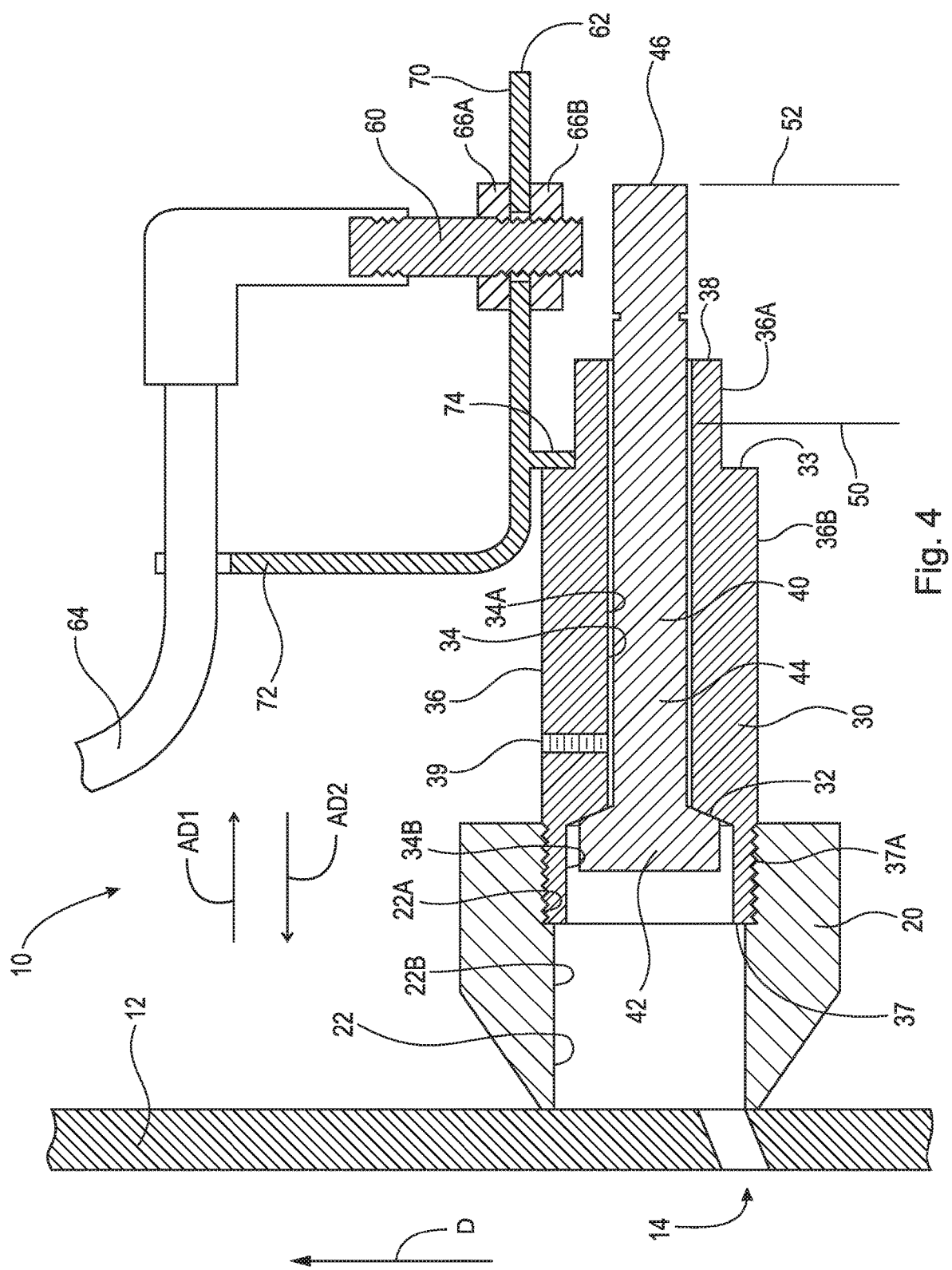

Adverting now to the figures, FIG. 1 is a top perspective view of pressure safety valve (PSV) indicator 10 secured to PSV discharge pipe 12. FIG. 2 is an exploded view of PSV indicator 10. FIG. 3 is a cross-sectional view of PSV indicator 10 taken generally along line 3-3 in FIG. 1, with plunger 40 in the retracted position. FIG. 4 is a cross-sectional view of PSV indicator 10 taken generally along line 4-4 in FIG. 1, with plunger 40 in the triggered position. The following descriptions should be read in view of FIGS. 1-4. PSV indicator 10 generally comprises connection 20, indicator cylinder 30, plunger 40, and inductive proximity sensor 60.

Connection 20 is secured to PSV discharge pipe 12 over through-bore 14 drilled therein. Through-bore 14 has a calculated diameter and is drilled into PSV discharge pipe 12 for slip stream velocity control into PSV indicator 10. This "slip stream" (i.e., the stream of discharge fluid that enters PSV indicator 10 through through-bore 14) is used to displace plunger 40 through indicator cylinder 30 in axial direction AD1, which causes end 46 out into the zone where plunger 40 is sensed by inductive proximity sensor 60. Connection 20 is secured to discharge pipe 12 using any suitable means (e.g., welding, soldering, adhesives, etc.). Connection 20 includes radially inward facing surface 22. In an example embodiment, radially inward facing surface comprises section 22A and section 22B. In an example embodiment, section 22A is threaded and section 22B is unthreaded. In an example embodiment, section 22B comprises a diameter that is less than the diameter of section 22A. In an example embodiment, radially inward facing surface 22 is a threaded (or socket welded) connection, such as a threadolet. As a discharge occurs, fluid moves through PSV discharge pipe 12 in direction D. Through-bore 14 is angled towards the discharged fluid (opposite direction D). The discharged fluid enters PSV indicator, specifically connection 20, via through-bore 14.

Indicator cylinder 30 is connected to connection 20. Indicator barrel comprises seat 32, radially inward facing surface 34, radially outward facing surface 36, end 37, and end 38. Indicator cylinder 30 is inserted into connection 20 such that radially outward facing surface 36 substantially abuts radially inward facing surface 22. In an example embodiment, radially outward facing surface 36 comprises threading 37A proximate end 37. As such, indicator cylinder 30 is connected to connection 20 via threading 37A and threaded section 22A (i.e., indicator cylinder 20 is screwed into connection 20). In an example embodiment, indicator cylinder 30 is inserted within radially inward facing surface 22 and welded to connection 20 using, for example, a back weld, fillet weld, socket weld, or any other suitable means of connection. Indicator cylinder 30 may further comprise adjustable tension control 39. Adjustable tension control 39 generally comprises a threaded through-hole and a set screw (not shown) arranged therein. The set screw is arranged to engage plunger 40 and can be adjusted to increase/decrease friction there between. Adjustable tension control 39 is designed to provide control on PSV indicator 10 for conditions of high vibration of the surrounding equipment and piping to prevent a false trigger event (i.e., triggering when no discharge has occurred).

In an example embodiment, adjustable tension control 39 may comprise a spring loaded pin with a detent at the end. Plunger 40 further comprises two grooves arranged on neck 44. A first groove is located at a first distance from head 42 and a second groove is located at a second distance from head 42, the first distance being greater than the second distance. When plunger 40 is in a retracted position, the detent engages the first groove to prevent plunger 40 from displacing in axial direction AD1 due to vibration. When plunger 40 is in a triggered position, the detent engages the second groove to prevent plunger 40 from displacing in axial direction AD2 due to vibration. The grooves are circumferentially arranged on neck 44 and may comprise a curved cross-section, square cross-section, rectangular cross-section, triangular cross-section, or any other suitable geometric shape. Radially inward facing surface 34 comprises section 34A and section 34B. In an example embodiment, section 34A comprises a diameter that is less than section 34B. Seat 32 connects section 34B with section 34A. Head 42 is arranged in section 34B and neck 44 is at least partially arranged in section 34A, as will be discussed in greater detail below. Indicator cylinder 30 further comprises surface 33, flat 31A, and flat 31B (not shown). Flats 31A and 31B are provided for a wrench such that indicator cylinder 30 can be properly screwed into connection 20. Radially outward facing surface 36 comprises section 36A and section 36B. Surface 33 is arranged between section 36A and section 36B. In an example embodiment, section 36A comprises a diameter that is less than the diameter of section 36B.

Plunger 40 is slindingly arranged in indicator cylinder 30. Inductor 40 comprises head 42, neck 44, and end 46. Head 42 is arranged within connection 20 and section 34B of indicator cylinder 30. Specifically, head 42 is axially arranged between PSV discharge pipe 12 and seat 32. Neck 44 is arranged to slidingly engage section 34A of radially inward facing surface 34.

As shown in FIG. 3, in the retracted position (i.e., when end 46 is aligned with retracted position line 50) prior to a discharge, head 42 abuts against PSV discharge pipe 12 and at least partially overlaps through-bore 14. In the retracted position, neck 44 and end 46 are arranged within connector 20 and indicator cylinder 30.

As shown in FIG. 4, in the triggered position (i.e., when end 46 is aligned with triggered position line 52), after a discharge has occurred, the discharged fluid enters PSV indicator 10 via through-hole 14 and displaces head 42, and thus plunger 40, in axial direction AD1 away from PSV discharge pipe 12. Plunger 40 fully displaces such that head 42 abuts against seat 32. When head 42 abuts against seat 32, a seal is created that prevents the fluid slip stream from releasing into the atmosphere. In an example embodiment, plunger 40 may only partially displace (i.e., head 42 is arranged axially between PSV discharge pipe 12 and seat 32). In the triggered position, neck 44 and end 46 at least partially protrude from indicator cylinder 30, providing local visual notification that a discharge has occurred. Plunger 40 provides the local visual indication and triggers inductive proximity sensor 60 to transmit an electrical signal to a remote location that the assigned PSV has lifted and discharged.

Inductive proximity sensor 60 (or inductive proximity switch) is a sensor arranged to detect metal targets approaching the sensor, without physical contact with the target. Inductive proximity sensor 60 may comprise the high-frequency oscillation type of sensor using electromagnetic induction, the magnetic type of sensor using a magnet, or the capacitance type of sensor using the change in capacitance. Generally, a high-frequency magnetic field is generated by a coil in inductive proximity sensor 60, specifically in the oscillation circuit. When a target approaches the magnetic field, an induction current (eddy current) flows in the target due to electromagnetic induction. As the target approaches the sensor, the induction current flow increases, which causes the load on the oscillation circuit to increase. Then, oscillation attenuates or stops. The sensor detects this change in the oscillation status with the amplitude detecting circuit, and outputs a detection signal. The nonferrous-metal type is included in the high-frequency oscillation type. The nonferrous-metal type incorporates an oscillation circuit in which energy loss caused by the induction current flowing in the target affects the change of the oscillation frequency. When a nonferrous-metal target such as aluminum or copper approaches the sensor, the oscillation frequency increases. On the other hand, when a ferrous-metal target such as iron approaches the sensor, the oscillation frequency decreases. When the oscillation frequency becomes higher than the reference frequency, the sensor outputs a detection signal. It should be appreciated that inductive proximity sensor 60 may be any device, module, or subsystem capable of detecting that a discharge has occurred. In an example embodiment, inductive proximity sensor 60 is arranged to sense and store the position of plunger 40. It should be appreciated that inductive proximity sensor 60 could be embodied as an optical sensor, limit switch, or other device capable of sensing a position of plunger 40. In an example embodiment, inductive proximity senor 60 could be embodied as a vibration sensor, magnetic sensor, position sensor, impact sensor, or any other sensor capable of detecting a discharge or a movement of plunger 40.

Inductive proximity sensor 60 comprises electrical connection 64 is mounted to indicator cylinder 30 via bracket 62. Bracket 62 comprises plate 70, plate 72, and plate 74. Plate 70 comprises through-bore 76. Inductive proximity sensor 60 is arranged in through-bore 76 with the sensor side directed toward indicator cylinder 30 and secured on either side of plate 70 by nuts 66A-B, respectively. Plate 74 is connected to plate 70 and comprises hole 78. Plate 74 may be connected to plate 70 via any suitable means (e.g., welding, soldering, adhesives, fasteners, etc.). In an example embodiment, plate 74 is arranged substantially perpendicular to plate 70 and hole 78 is generally semi-circular. In an example embodiment, plate 74 is arranged non-perpendicular to plate 70. Plate 72 is connected to plate 70 and comprises cutout 80. Plate 72 may be connected to plate 70 via any suitable means (e.g., welding, soldering, adhesives, fasteners, etc.). In an example embodiment, plates 72 and 70 are integrally formed. In an example embodiment, plate 72 is arranged substantially perpendicular to plate 70. In an example embodiment, plate 72 is arranged non-perpendicular to plate 70. Cutout 80 is arranged to secure and/or direct electrical connection 64.

Bracket 62 is mounted to indicator cylinder 30. Specifically, plate 74 is connected to surface 33 and section 36A. Hole 78 is arranged concentrically around section 36A and plate 74 abuts against surface 33. Plate 74 is connected to cylinder 30 via any suitable means (e.g., welding, soldering, adhesives, fasteners, etc.). In an example embodiment, bracket 62 is mounted to connection 20. Inductive proximity sensor 60 is secured to switch bracket 62 and is operatively arranged to signal when plunger 40 has moved to the triggered position. Inductive proximity sensor 60 determines that the plunger is in the triggered position and sends a signal through electrical connection 64 to a remote location, such as a control room, indicating that a discharge has occurred. Electrical connection 64 is guided through cutout 80 and away from PSV indicator 10. Electrical connection 64 may be electrical, optic, or any other suitable means of transmitting a signal to a remote location.

In an example embodiment, electrical connection 64 may be connected to a transmission device (not shown). The transmission device is arranged to send a signal to a receiver (not shown) at a remote location indicating that a discharge has occurred. The transmission device generally comprises a transmitter and a power source. The power source is intended to be a battery or any combination of multiple batteries that can produce sufficient voltage to power the components and circuitry in the transmission device (i.e., the transmitter and inductive proximity sensor 60). The transmitter includes an antenna and is operatively arranged to communicate with a remote receiver (e.g., a computer, a smartphone, an iPad® tablet computer, a Surface® computer, or any other computing device) and can be utilized to send/receive a wireless signal/communication. It should be appreciated that "wireless communication(s)" as used herein is intended to mean Radio Frequency Identification (RFID) communication, Bluetooth® protocols, Near field Communication (NFC), Near Field Magnetic Inductance Communication (NFMIC), Wi-Fi, LTE, Airdrop® communication, or any other wireless protocol sufficient to communicate with the remote receiver.

In an example embodiment, and as previously discussed, the transmission device is used to send a signal indicating when plunger 40 is displaced, so that another party is aware that a discharge has occurred from a remote location (i.e., without having to be within viewing distance of PSV indicator 10). In addition, the transmission device can be used to send a signal indicating the position of plunger 40, so that the party is aware of the magnitude of discharge that occurred from the remote location.

In an example embodiment, the transmission device further comprises a microcontroller. The microcontroller may include a memory element and a processing unit. The memory element is capable of storing a set of non-transitory computer readable instructions. The processing unit is arranged to execute the set of non-transitory computer readable instructions.

After a discharge has occurred, PSV indicator 10 can be manually reset by pressing plunger 40 back into the indicator barrel 30 in axial direction AD2. In an example embodiment, PSV indicator 10 further comprises a spring return for automatic reset (not shown). PSV indicator 10 is designed for severe duty applications of high velocity relief events of both high temperature and very low temperature (cryo) conditions.

It will be appreciated that various aspects of the disclosure above and other features and functions, or alternatives thereof, may be desirably combined into many other different systems or applications. Various presently unforeseen or unanticipated alternatives, modifications, variations, or improvements therein may be subsequently made by those skilled in the art which are also intended to be encompassed by the following claims.

LIST OF REFERENCE NUMERALS

10 Pressure safety valve (PSV) indicator
12 Pressure safely valve (PSV) discharge pipe
14 Through-bore
20 Connection
22 Radially inward facing surface
22A Section
22B Section
30 Indicator cylinder
31A Flat
31B Flat (not shown)
32 Seat
33 Surface
34 Radially inward facing surface
34A Section
34B Section
36 Radially outward facing surface
36A Section
36B Section
37 End
37A Threading
38 End
39 Adjustable tension control
40 Plunger
42 Head
44 Neck
46 End
50 Retracted position line
52 Triggered position line
60 Inductive proximity sensor
62 Bracket
64 Electrical connection
66A Nut
66B Nut
70 Plate
72 Plate
74 Plate 76 Through-bore
78 Hole
80 Cutout
D Direction
AD1 Axial direction
AD2 Axial direction

What is claimed is:

1. A pressure safety valve (PSV) indicator arranged to be secured to a PSV discharge pipe over a first through-bore arranged therein, the PSV indicator comprising:
    a connection including a first radially inward facing surface;
    an indicator cylinder, including:
        a radially outward facing surface;
        a first end connected to the connection;
        a second end; and,
        a second radially inward facing surface extending from the first end to the second end;
    a plunger slidably arranged in the indicator cylinder, the plunger including:
        a head; and,
        a neck having a third end; and,
    an inductive proximity sensor operatively arranged to determine the position of the plunger;
    wherein:
        in a retracted position, the head abuts against the PSV discharge pipe and at least partially covers the first through-bore and the third end is arranged completely within the indicator cylinder; and,
        in a triggered position, the head is separated from the PSV discharge pipe and the third end protrudes from the indicator cylinder.

2. The PSV indicator as recited in claim 1, wherein the radially outward facing surface is arranged in the first radially inward facing surface.

3. The PSV indicator as recited in claim 1, wherein the indicator cylinder is connected to the connection via threading.

4. The PSV indicator as recited in claim 1, further comprising an adjustable tension control operatively arranged in the indicator cylinder.

5. The PSV indicator as recited in claim 1, wherein the inductive proximity sensor is connected to the indicator cylinder.

6. The PSV indicator as recited in claim 5, wherein the inductive proximity sensor is connected to the indicator cylinder via a bracket.

7. The PSV indicator as recited in claim 6, wherein the inductive proximity sensor is secured within in a second through-bore arranged on the bracket.

8. The PSV indicator as recited in claim 1, wherein the second radially inward facing surface comprises a first section arranged to engage with the neck and a second section arranged to engage with the head.

9. The PSV indicator as recited in claim 8, wherein the first section comprises a first diameter and the second section comprises a second diameter, the second diameter being greater than the first diameter.

10. The PSV indicator as recited in claim 9, wherein a seat is arranged between the first section and the second section.

11. The PSV indicator as recited in claim 10, wherein when a discharge occurs, the head is displaced in a first axial direction and abuts against the seat.

12. A pressure safety valve (PSV) indicator arranged to be secured to a PSV discharge pipe over a through-bore arranged therein, the PSV indicator comprising:
    an indicator cylinder, including:
        a first end connected to the discharge pipe;
        a second end;
        a radially outward facing surface; and,
        a radially inward facing surface extending from the first end to the second end;
    a plunger slidably arranged in the indicator cylinder, the plunger including:
        a head; and,
        a neck having a third end; and,
    an inductive proximity sensor arranged proximate the second end and operatively arranged to determine the position of the plunger;
    wherein:
        in a retracted position, the head abuts against the PSV discharge pipe and at least partially covers the through-bore and the third end is aligned with the second end; and,
        in a triggered position, the head is separated from the PSV discharge pipe and the third end is displaced in a first axial direction toward the inductive proximity sensor.

13. The PSV indicator as recited in claim 12, further comprising an adjustable tension control operatively arranged in the indicator cylinder.

14. The PSV indicator as recited in claim 12, wherein the inductive proximity sensor is connected to the indicator cylinder.

15. The PSV indicator as recited in claim 14, wherein the inductive proximity sensor is connected to the indicator cylinder via a bracket.

16. The PSV indicator as recited in claim 12, wherein the radially inward facing surface comprises:
    a first section having a first diameter arranged to engage with the neck; and,
    a second section having a second diameter arranged to engage with the head, the second diameter being greater than the first diameter.

17. The PSV indicator as recited in claim 16, wherein a seat is arranged between the first section and the second section.

18. The PSV indicator as recited in claim 17, wherein when a discharge occurs, the head is displaced in a first axial direction and abuts against the seat.

* * * * *